July 7, 1953     S. TIERNEY, JR     2,644,920

INSTRUMENT FOR MEASURING MAGNETIC PERMEABILITY

Filed Sept. 7, 1951

S. Tierney Jr.
INVENTOR.

Patented July 7, 1953

2,644,920

UNITED STATES PATENT OFFICE 2,644,920

INSTRUMENT FOR MEASURING MAGNETIC PERMEABILITY

Samuel Tierney, Jr., Chula Vista, Calif., assignor to Rohr Aircraft Corporation, Chula Vista, Calif., a corporation of California Application September 7, 1951, Serial No. 245,574

5 Claims. (Cl. 324—34)

This invention relates to an instrument for measuring the magnetic permeability of iron or steel sheets or any workpiece containing paramagnetic material.

It is an object of the invention to provide an instrument in which the permeability is determined by effects produced by the variations in magnetic flux through the workpiece. It is an important feature of the invention that means is provided in the form of a tuning fork to cause these variations to take place at a very steady or constant rate.

Another object is to provide means whereby the rate of variation of the magnetic flux through the workpiece may be easily and quickly changed at the will of the operator.

A further object is the provision of means whereby the magnetic flux through the workpiece is provided by the tuning fork.

Another object is the provision of means whereby the length of the magnetic flux path through the workpiece may be readily controlled by the operator.

Figure 1:
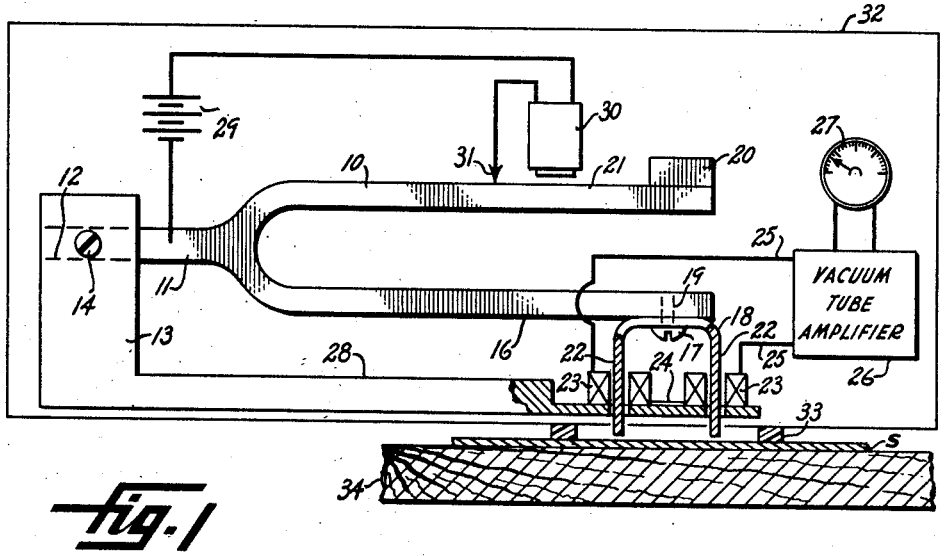
Figure 2:
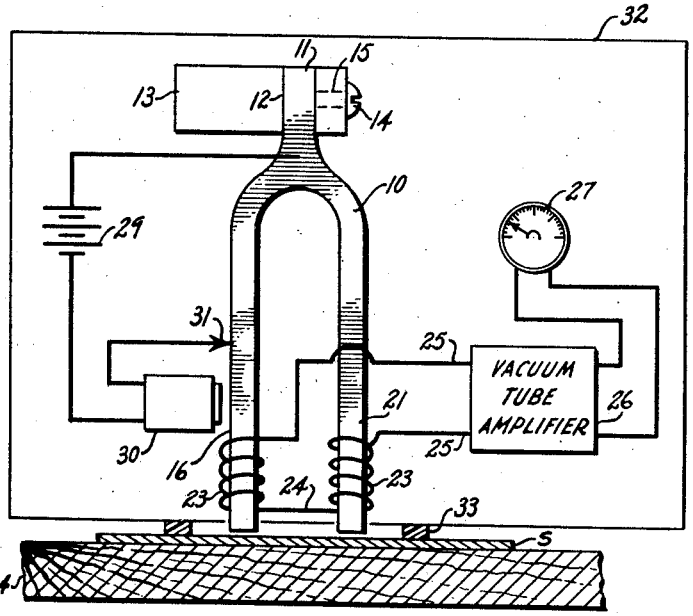

Further objects will become apparent as the description of the instrument proceeds. For a better understanding of the invention, reference is made to the accompanying drawings, in which:

Fig. 1 is a front view, partly in section and schematic, of an instrument embodying the invention, and Figure 2 is a view similar to Figure 1, showing a modified form of the invention.

It has been found that changes in the internal structure of the metal composing a workpiece cause changes in its magnetic permeability. The presence of hard areas in a metal sheet which have been caused by cold bending the sheet into a workpiece of desired shape may be detected by determining the magnetic permeability at such areas and comparing it to the permeability of the sheet before bending. Also the presence of blowholes and cracks in ferrous metal castings may be detected by determining the magnetic permeability of those areas. It is the purpose of the present invention to provide a portable instrument by which any workpiece may be explored easily and without damaging it, to determine its magnetic permeability.

Referring to Figure 1, the illustrated embodiment of the invention shows a tuning fork 10 made of steel or non-ferrous stiff metal and having a handle 11 received in a rectangular slot 12 which extends to the top of a support 13 formed of brass, Bakelite or other diamagnetic material. The tuning fork is secured in position by a screw 14 screwed into a threaded opening 15 in support 13, the end of the screw engaging handle 11 as shown in Figure 2. The lower prong 16 of the fork has secured thereto by a screw 17 a strong permanent magnet 18 of Alnico or other suitable material. The screw passes freely through a hole in the yoke of the magnet and enters a threaded hole 19 in prong 16. In certain cases it may be desirable to balance the tuning fork which may be done by a balance weight 20 secured to the end portion of upper prong 21 by a screw or other securing means, not shown. The mass and location of weight 20 is preferably such as to make the moment of inertia of prong 16 together with magnet 18 with reference to handle 11 substantially equal to that of prong 21 and weight 20. The legs 22 of the magnet pass through a pair of coils 23 having a large number of turns of fine copper wire, the clearance between the coils and legs 22 being of the order of from 0.5 to 2.0 thousandths of an inch; the clearance being exaggerated in the drawing for clarity. At their lower ends, the coils are connected together by a wire 24, the direction of winding of the coils being such that the voltage generated in one coil adds to that generated in the other. The upper ends of the coils are connected by a pair of flexible leads 25 to the input terminals of a vacuum tube amplifier 26 whose output terminals are connected to a voltmeter 27 having a graduated scale marked in volts or units of permeability. Coils 23 are detachably connected to a horizontal shelf 28 constituting an integral part of support 13 by any suitable means (not shown) which permits the distance between the coils to be varied. For this purpose the lower end of the insulating spool on which the wire of each coil is wound may have a threaded hole to receive the threaded upper end of a screw, the screws passing through a narrow slot extending lengthwise of shelf 28. The tuning fork 10 may be continuously vibrated by current from a battery 29 which passes through the coil of an electromagnet 30 and a make-and-break contact 31.

The aforementioned parts may be mounted in a light weight casing 32 formed of any suitable insulating material, the scale and pointer of meter 27 being visible through a side or top of the casing. As shown, casing 32 is provided with openings through which the magnet legs 22 extend. A ring 33 of insulation material is secured to the outside of casing 32 for slidable contact with the surface of the metal sheet S or other workpiece to be tested, the thickness of this ring being such as to provide a very small clearance between the ends of magnet legs 22 when vibrating and sheet S. The long, flat sheet S may be supported on a flat floor 34 made of wood or other diamagnetic material. While a battery has been shown as the current source, an electromagnet designed to be operated by alternating current may be used to actuate the tuning fork in a known manner.

When the instrument is in operation and placed over one end of sheet S, the variation in the air gap between the sheet and ends of legs 22 causes variations in the magnetic flux cutting coils 23, thereby generating a voltage in these coils which is amplified and indicated on meter 27. As the instrument is moved along the sheet toward its other end, when a region of greater magnetic permeability is reached, the number of lines of flux cutting coils 23 is increased with an attendant increase in the voltage generated therein and a larger meter reading. The meter reading is thus a function of the permeability of sheet S or other workpiece being explored and its scale may be calibrated in units of permeability. The instrument is moved back and forth over the sheet until it has been entirely explored and any regions of high or low permeability noted and marked. When a workpiece having a sharply curved surface is to be tested, a magnet 18 is selected whose legs 22 are close together as, for example, three quarters inch. When a large flat sheet of steel is to be tested, screw 17 may be removed, the small magnet withdrawn and a magnet attached whose legs are spaced for example, 2 inches apart (one of the coils 23 being moved correspondingly). The substitution of the wider magnet results in a substantial saving of the operator's time since a much larger area is explored at each pass of the instrument from one end of the sheet to the other.

A set of, for example, three tuning forks in which the threaded hole 19 is the same distance from the handle may be provided, having natural vibration frequencies of 120, 240 and 480 per second. When starting to test an unknown material with the 120 cycle fork, if its permeability is so low that an unsatisfactory displacement of the meter pointer results, screw 14 may be loosened, the tuning fork withdrawn and the fork having a natural frequency of 240 cycles substituted. Since the vibration of magnet 18 is now at twice the former speed and the rate of change in the magnetic flux cutting coils 23 is increased correspondingly, the voltage generated in coils 23 and the reading of meter 27 are correspondingly increased. In event an unsatisfactory reading is still secured, the fork having a resonant frequency of 480 cycles may be substituted. It will be understood that for certain materials of very low permeability, forks of still higher frequencies, as for example, 960 or 1920 may be used. Instead of coils 23 being stationary, they may be wound around the magnet legs 22 and move with the magnet, in which case, the shelf extension 28 may be omitted.

The use of a tuning fork instead of an ordinary lever for vibrating magnet 18 offers advantages in case of variation of the voltage supply. If electromagnet 30 which drives the fork is supplied with 60 cycle commercial current, a drop in voltage for a short period such as one half to a second, has no influence whatever on the frequency of vibrations of the magnet and no substantial influence on its amplitude of vibration. There is so much energy stored in the vibrating mass of the prongs, magnet 18 and balance weight 20 when vibrating at full amplitude at the resonant frequency that it takes many seconds for the air friction to dissipate it and for the prongs of the fork to reach a position of rest, in the absence of any further propelling impulses from actuating magnet 30. Brief interruptions of such impulses or a decrease in their amplitude due to a decrease in the voltage supplied to the magnet for a short interval, have no substantial effect on the voltage induced in coils 23 or the permeability determination.

The embodiment of the invention shown in Figure 2 is generally similar to that of Figure 1 but in this case the slot 12 is vertical and the prongs of tuning fork 10 extend in a direction normal to sheet S. Also, the entire tuning fork may be of steel and permanently strongly magnetized to make the lower end of prong 16 a north pole and the lower end of prong 21 a south pole. Coils 23 are preferably wound around and move with the prongs of the fork, although they may be stationary as above described. The instrument is used in the same manner as that above described, the meter reading increasing when a region of sheet S of greater permeability is reached. Since in this species there is much less change in the length of the air gap between the ends of the magnet legs and sheet S than in the species of Figure 1, a greater portion of the change in the number of lines of flux cutting coils 23 is due to the difference in permeabilities of different regions of the sheet. In both embodiments of the invention, the intensity of magnetization is preferably high but somewhat below saturation as, for example, 10,000 gausses.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In an instrument for determining the magnetic permeability of a workpiece containing paramagnetic material, in combination: a pair of spaced apart magnetized cores composed of material of high magnetic permeability; a two pronged tuning fork; means secured to the movable end of one prong for supporting said cores with their ends disposed closely adjacent the surface of the workpiece; wire coils surrounding said cores; a support arranged to support said coils at a predetermined distance apart and with small clearance spaces between the coils and said cores; a conductor connecting the end of one coil to the end of the other; and electrical means for rapidly and continuously vibrating said tuning fork prongs to continuously vary the reluctance of the magnetic circuit through said cores and workpiece.

2. An instrument as claimed in claim 1; in which said cores extend in a direction substantially normal to a prong of the tuning fork.

3. An instrument as claimed in claim 1; in which a common supporting means is provided to support said tuning fork and coils.

4. An instrument as claimed in claim 1; in which said cores are the limbs of a U shaped magnet, and readily detachable means secure said magnet to the end of one prong only of the fork.

5. In an instrument for determining the magnetic permeability of a workpiece containing paramagnetic material, in combination: a tuning fork; a U shaped permanent magnet; means for securing said magnet to one prong of the fork near the end of said prong; a balance weight secured to the other prong of the fork; electrically conductive means associated with the legs of said magnet and responsive to the variations of magnetic flux in said magnet; electrical means for continually vibrating said tuning fork; and means engaging the handle of said tuning fork to support the fork in a desired position adjacent the workpiece.

SAMUEL TIERNEY, Jr.

References Cited in the file of this patent

UNITED STATES PATENTS

| Number | Name | Date |
|---|---|---|
| 2,103,224 | Schweitzer | Dec. 21, 1937 |
| 2,207,592 | Lenk | July 9, 1940 |
| 2,527,170 | Williams | Oct. 24, 1950 |
| 2,542,893 | Bender et al. | Feb. 20, 1951 |